Patented Mar. 8, 1938

2,110,375

UNITED STATES PATENT OFFICE 2,110,375

SPRAY REACTION

Herbert A. Winkelmann, Eugene W. Moffett, and William C. Calvert, Chicago, Ill., assignors to Marbon Corporation, a corporation of Delaware No Drawing. Application June 17, 1936, Serial No. 85,797

6 Claims. (Cl. 260—1)

This invention relates to an improved method for manufacturing rubber derivatives, and more particularly to an improved method for manufacturing rubber hydrochlorides.

Rubber in sheet form may be reacted with gaseous or liquefied hydrogen chloride or chlorine. The reaction with the gaseous reagent is slow compared to the reaction with the liquefied reagent. This is particularly true at low temperatures where the critical pressure for the formation of liquid is low. On the other hand when undissolved rubber is contacted with a bath of liquid reagent the rubber and reaction product absorbs large quantities of the liquid which is difficult to remove from the product. Furthermore, the large excess of liquid which is normally used dissolves part of the reaction product.

We have found that when solid sheet rubber is contacted with a spray or mist of liquid reagent the reaction takes place smoothly without leaching away the reaction product, and gives a product which is readily isolated since the amount of absorbed excess liquid is at a minimum.

The production of a mist of liquid reagent and the reaction of the mist with rubber may be carried out as follows: The reagent in the gaseous state is contacted with the spaced sheet rubber. The temperature of the gas is then lowered to below the critical temperature corresponding to the pressure of the gas. This causes a precipitation of the reagent in the form of a fine mist or spray until the pressure falls below the critical pressure corresponding to the temperature. The temperature is then raised, additional gas, if necessary, admitted to the system and the process repeated. Since pressure and temperature are dependent on each other it is apparent that a similar result can be obtained by varying the pressure instead of the temperature although any method involving raising or lowering pressure is not as commercially practical as the method of raising and lowering temperatures. The preferred method which, however, is difficult of control, is to admit the gas continuously at above the critical pressure corresponding to the temperature of the rubber and control the admission of the gas and the pressure so that there is always a mist of reagent in contact with the rubber throughout the reaction, but not such a precipitation of liquid as to build up a pool in the reactor.

The fog or mist method of this invention is of particular advantage in producing low temperature soluble type rubber hydrochlorides which are difficult, if not impossible, to produce with gaseous hydrogen chloride. This soluble type product may be produced by reacting spaced sheet rubber of .01" thickness with the spray or mist of hydrogen chloride at around the critical pressure of hydrogen chloride at approximately −60° C. The method, however, is applicable at elevated temperature up to the critical point of the reagent; approximately 55° C. for hydrogen chloride. The reaction is apparently partially a gaseous and liquid reaction since the products appear to be somewhat different from the corresponding products made with either liquefied or gaseous hydrogen chloride.

We claim:

1. The method which comprises reacting rubber with a hydrogen halide in liquid spray form.

2. The method which comprises reacting rubber with a normally gaseous hydrogen halide in the state of a liquid spray.

3. The method which comprises reacting rubber with a liquid spray of hydrogen chloride.

4. In the process of reacting rubber with a hydrogen halide the step of precipitating the reagent as a liquid from its gaseous state in contact with rubber.

5. In the process of reacting rubber with hydrogen chloride, the step of precipitating the hydrogen chloride as a liquid from its gaseous state in contact with rubber.

6. In the process of reacting rubber with hydrogen chloride, the step of lowering the temperature of gaseous hydrogen chloride in contact with rubber sufficiently to precipitate the hydrogen chloride in the form of a mist on the rubber.

HERBERT A. WINKELMANN.
EUGENE W. MOFFETT.
WILLIAM C. CALVERT.